(12) United States Patent
Gronli et al.

(10) Patent No.: US 8,904,891 B2
(45) Date of Patent: Dec. 9, 2014

(54) WIPER FOR TRANSLATING RAM

(75) Inventors: Timothy D. Gronli, Rockford, IL (US); Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 645 days.

(21) Appl. No.: 13/185,945

(22) Filed: Jul. 19, 2011

(65) Prior Publication Data

US 2013/0019420 A1 Jan. 24, 2013

(51) Int. Cl.
| | |
|---|---|
| *F16H 25/22* | (2006.01) |
| *F16C 29/06* | (2006.01) |
| *F16H 25/20* | (2006.01) |
| *F16H 25/24* | (2006.01) |

(52) U.S. Cl.
CPC ....... *F16C 29/0685* (2013.01); *F16H 2025/204* (2013.01); *F16H 25/2418* (2013.01)
USPC .......................................... 74/89.4; 74/89.33

(58) Field of Classification Search
CPC ............. F16C 29/0685; F16H 25/2418; F16H 2025/204
USPC ..................... 74/89.4, 89.41, 89.33
See application file for complete search history.

(56) References Cited

U.S. PATENT DOCUMENTS

| | | | |
|---|---|---|---|
| 2,403,092 A | | 2/1943 | Lear |
| 2,778,344 A | * | 1/1957 | Compton et al. ................. 91/45 |
| 3,824,904 A | | 7/1974 | Visser |
| 4,179,944 A | | 12/1979 | Conner |
| 4,407,511 A | | 10/1983 | Benton et al. |
| 4,753,071 A | | 6/1988 | Sugden |
| 5,144,851 A | | 9/1992 | Grimm et al. |
| 5,269,343 A | * | 12/1993 | Trapp ............................ 137/554 |
| 5,398,780 A | | 3/1995 | Althof et al. |
| 6,237,434 B1 | | 5/2001 | Brown et al. |
| 7,810,208 B2 | | 10/2010 | Jan Geelhoed |
| 2002/0144560 A1 | | 10/2002 | Yatsushiro et al. |
| 2009/0019658 A1 | | 1/2009 | Lovchik et al. |
| 2011/0169357 A1 | | 7/2011 | Gieras et al. |

FOREIGN PATENT DOCUMENTS

JP 5044810 B2 10/2012

OTHER PUBLICATIONS

European Search Report, mailed Oct. 4, 2012.

* cited by examiner

*Primary Examiner* — David M Fenstermacher
*Assistant Examiner* — Terence Boes
(74) *Attorney, Agent, or Firm* — Kinney & Lange, P.A.

(57) ABSTRACT

A wiper for a translating ram with recessed features includes a first element conforming to the recessed features of the translating ram; and a second element conforming to the external surface of the translating ram. The first element and second element conform to the cross-section of the translating ram when placed axially adjacent.

15 Claims, 4 Drawing Sheets

WIPER FOR TRANSLATING RAM

STATEMENT OF GOVERNMENT INTEREST

The U.S. Government has a paid-up license in this invention and the right in limited circumstances to require the patent owner to license others on reasonable terms as provided for by the terms of FA8002-07-G-0511 awarded by the Department of Defense.

BACKGROUND

The present invention relates to linear actuators and more particularly to translating rams with recessed portions.

Throughout history, engineers have invented mechanisms that have had the capability to move objects. One particular category of these mechanisms is referred to as an actuator. Actuators can be designed to move objects in a rotary motion, or in a linear motion. A rotary actuator is simply a gearbox that either increases or decreases the rotational speed of a prime mover, typically a hydraulic motor, an internal combustion engine, a turbine engine, or an electric motor, to provide a desired level of rotational speed and torque at the output of the machine. Some examples of rotary actuators include: gearboxes, transmissions, differentials, hydraulic rotary actuators, and rotary electro-mechanical actuators. Linear actuators are machines designed to provide force and linear displacement to an object. Some examples of linear actuators include: rack & pinion actuators, hydraulic rams, ball screw actuators, and crank arm actuators.

Historically, hydraulic/pneumatic motors and hydraulic/pneumatic rams have been the primary source of power for both linear and rotary actuators. Hydraulic systems offer many advantages to the designer. These advantages include: high power density, accurate position control, low inertia (for high frequency response), and overload protection (via pressure relief valves).

In the last several decades, engineers have started to replace hydraulic/pneumatic actuation systems with electro-mechanical actuation systems. Electro-mechanical actuators ("EMAs") offer increased efficiency over their hydraulic and pneumatic counterparts and can eliminate the fire hazards and leakage potentials associated with the hydraulic fluids used in hydraulic actuation systems. One application for linear EMAs is on a space craft thrust vector control system. These EMAs can include redundant architecture to prevent single point failures.

SUMMARY

A wiper for a translating ram with recessed features includes a first element conforming to the recessed features of the translating ram; and a second element conforming to the external surface of the translating ram. The first element and second element conform to the cross-section of the translating ram when placed axially adjacent.

A method of manufacturing a wiper for a translating ram with recessed portions includes forming a first element to conform to the recessed portions of the translating ram; and forming a second element to fit axially adjacent to the first element and to conform to the external surface of the translating ram.

DETAILED DESCRIPTION

Figure 1A:
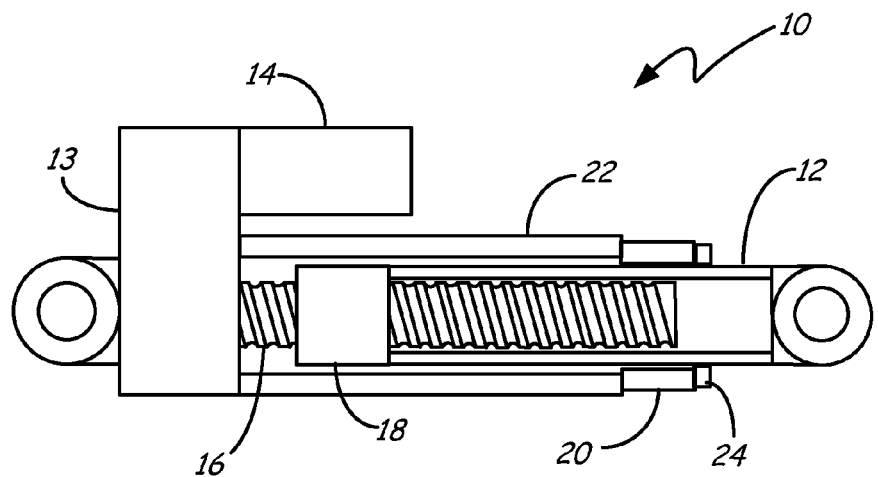
FIG. 1A is block diagram of a linear actuator with a translating ballscrew ram.
Figure 1B:
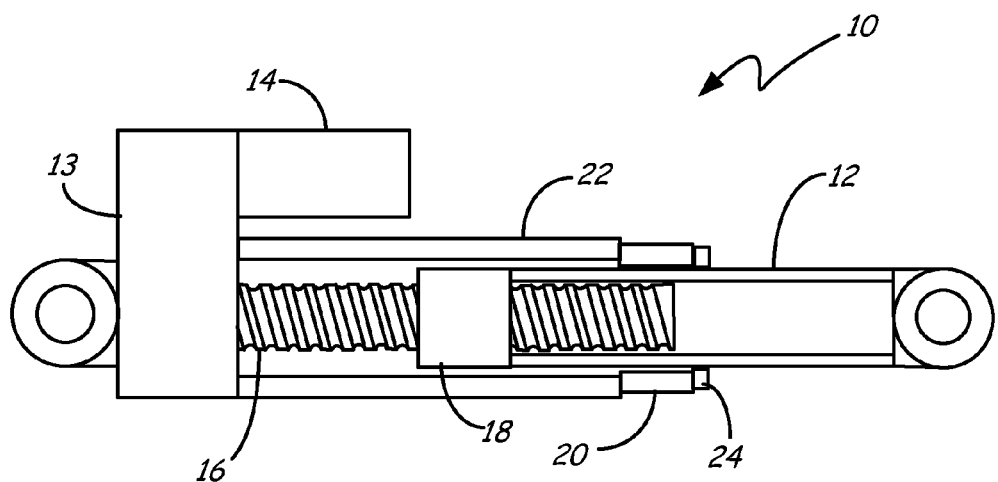
FIG. 1B is block diagram of a linear actuator with a translating ballscrew ram fully extended.

FIG. 1A is block diagram of a linear actuator with a translating ballscrew ram. FIG. 1B is block diagram of a linear actuator with a translating ballscrew ram fully extended. Actuator 10 includes translating ram 12, gearbox 13, motor 14, ballscrew shaft 16, ballscrew nut 18, recirculating ballspline 20, housing 22 and wiper 24. Translating ram 12 includes recessed portions 26 axially along the length of ram 12 (see FIGS. 2A-2B).

Motor 14 can be a permanent magnet electric motor with a brake. Motor 14 is connected to ballscrew shaft 16 through gearbox 13 and and causes shaft 16 to rotate. Ballscrew shaft 16 is connected to translating ram 12 through ballscrew nut 18. The rotation of ballscrew shaft 16 causes ballscrew nut 18 to move axially along ballscrew shaft 16. Translating ram 12 is connected to ballscrew nut 18 and moves with nut 18. This movement of nut 18 causes ram 12 to extend and retract relative to housing 22. Translating ram 12 moves through recirculating ballspline 20 and wiper 24, which are each held in place by housing 22. Recessed portions 26 of translating ram 12 fit together with recirculating ballspline 20, allowing axial movement of ram 12 and resisting rotation. Actuator 10 can include a second motor with brake, gears, or any other configuration of parts known in the art to add redundancy and/or tailor actuator 10 to the needs of a particular application.

Actuator 10 causes translating ram 12 to extend or retract linearly as needed. Using recirculating ballspline 20 with translating ram 12 with recessed portions 26 gives ram 12 higher efficiencies than if ram 12 did not have recessed portions 26 (and a conventional bushing was used). This is due to the larger surface area contact of balls in recirculating ballspline 20 contacting recessed portions 26 of ram 12. Recirculating ballspline 20 with recessed portions 26 also allow low friction linear movement of ram 12 with anti-rotation torque transfer.

The use and benefits of recirculating ballspine 20 with recessed portions 26 are dependent upon the ball elements in recirculating ballspline 20 corresponding exactly with the dimensions of recessed portions 26. As translating ram 12 extends out and then retracts, there is a danger of dirt or other debris becoming stuck on ram 12 and entering recirculating ballspline 20. That foreign debris can prevent the low friction movement of ram 12, and may even cause translating ram 12 to jam up. Wiper 24 fits over ram 12 to prevent any dirt or debris from entering recirculating ballspline 20 as translating ram 12 retracts into housing 22.

Figure 2A:
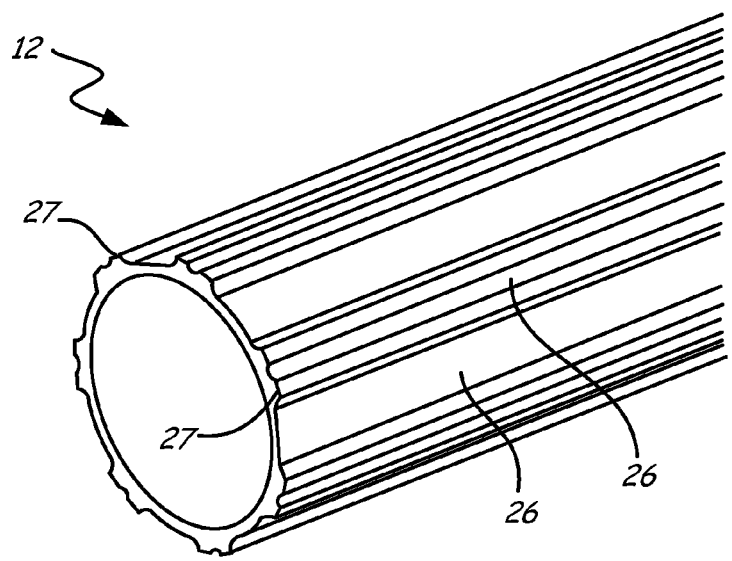
FIG. 2A is a perspective view of a portion of the translating ram of FIG. 1A.
Figure 2B:
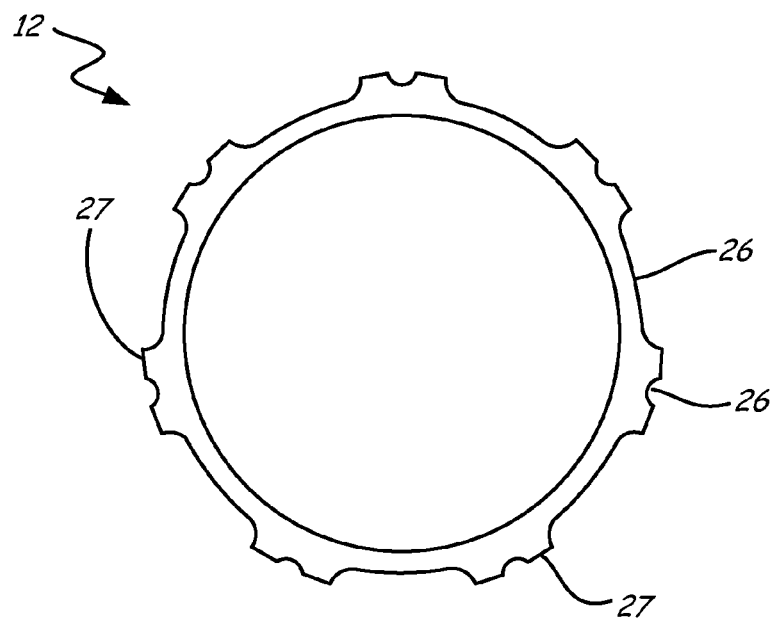
FIG. 2B is a cross-sectional view of the translating ram of FIG. 2A.

FIG. 2A is a perspective view of a portion of the translating ram 12 of FIG. 1A, and FIG. 2B is a cross-sectional view of the translating ram 12 of FIG. 2A. Translating ram 12 includes recessed portions 26 and external surfaces 27.

Translating ram 12 can be made of steel, stainless steel, titanium aluminum, plastic or any other material that fits the needs of actuator 10. Recessed portions 26 can run the length of translating ram 12 and can be in the configuration shown or can come in other configurations depending on the needs of the system. Recessed portions 26 can result in sharp edges between recessed portions 26 and external surfaces 27 in the cross-section of translating ram 12. Past wipers were configured to fit cylindrical rams without the sharp edged recessed portions 26. Because there were no sharp edged recessed portions, past wipers were generally easy to fit and manufacture. A conventional O-ring could be placed on prior art rams to form a seal. However, with the introduction of sharp edged recessed portions 26, conventional O-rings could no longer be used as wipers were required to fit tightly around a cross-section with sharp edges.

Figure 3A:
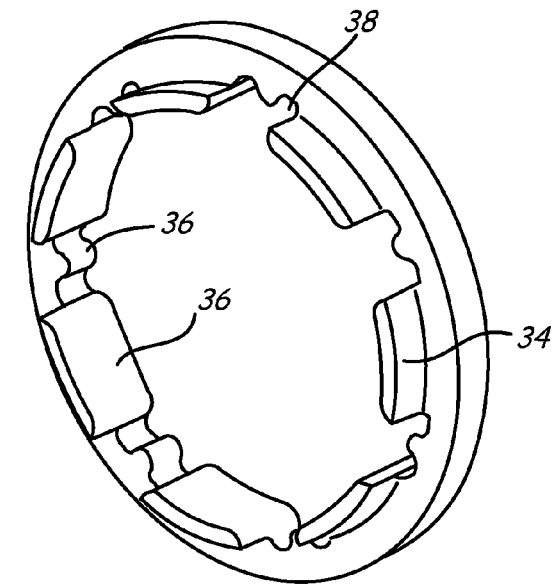
FIG. 3A is a perspective view of a first element for a wiper for a translating ram.
Figure 3B:
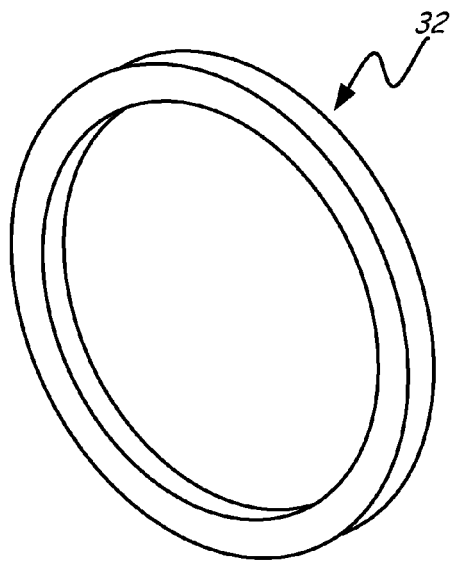
FIG. 3B is perspective view of a second element for a wiper for a translating ram.
Figure 3C:
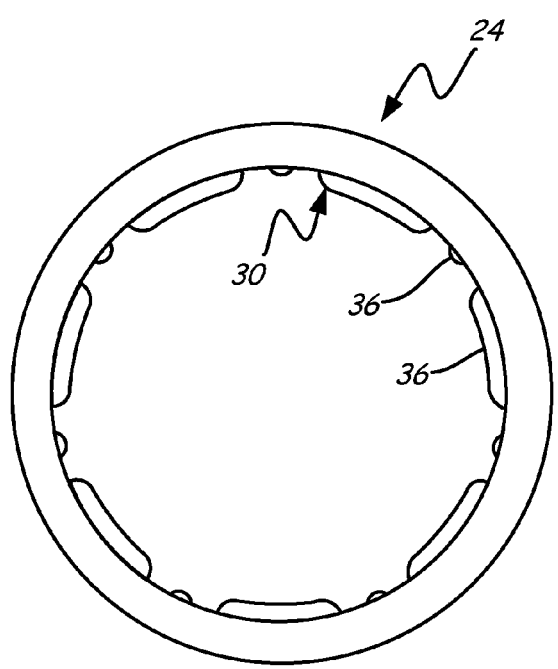
FIG. 3C is an end view of the wiper with the first and second elements of FIGS. 3A-3B.

FIG. 3A is a perspective view of first element 30 for wiper 24 for translating ram 12. FIG. 3B is an end view of second element 32 for wiper 24 for translating ram 12. FIG. 3C is an end view of wiper 24 with the first and second elements 30, 32 of FIGS. 3A-3B.

Wiper 24 includes first element 30 and second element 32. First element 30 includes extensions 34 to support second element 32, portions 36 conforming to the recessed features of the translating ram; and gaps 38 to go over external cylindrical surface. Second element 32 conforms to the external surfaces of translating ram 12.

As seen in FIG. 3C, second element 32 can be placed axially adjacent to first element 30 and over extensions 34 to form wiper 24. First element 30 and second element 32 can be made of an elastic material that has good sliding wear properties. The material properties helps wiper 24 seal against with ram 12, while allowing ram 12 translate through but not wear on wiper 24. An example of an appropriate material is Turcon®, a Polytetrafluoroethylene made by Trelleborg Sealing Solutions.

Past attempts at making wipers for translating rams with recessed portions were unsuccessful due to the inability to machine or cast internal sharp corners. Machining or casting always involved some finite radius on the cutting tool used or the casting, resulting in a wiper with gaps between it and the translating ram sharp corners. Wiper 24 is able to seal even around sharp corners by including first element 30 to seal recessed portions 26 and placing it adjacent to second element 30 conforming to outer portions 27 of translating ram 12. The use of two elements, 30 and 32 allow wiper 24 to seal both recessed portions and sharp corners generated by recessed portions 26 on ram 12.

Figure 4A:
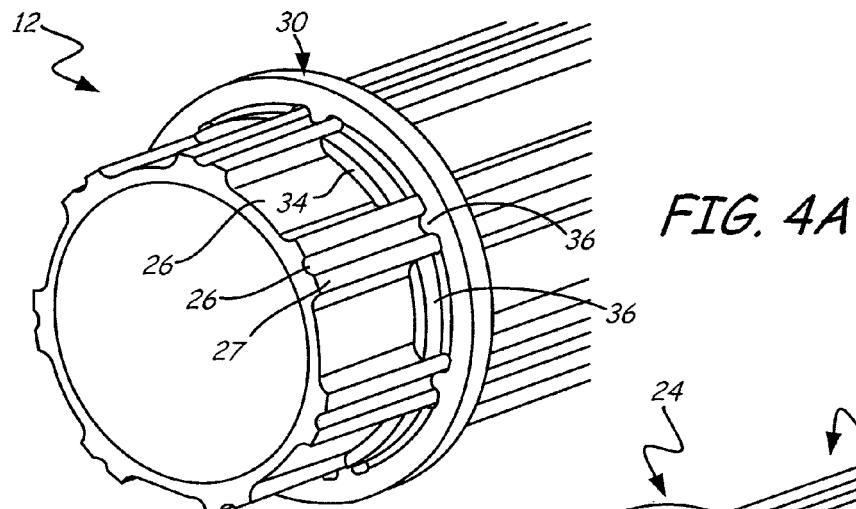
FIG. 4A is a perspective view of a portion of a translating ram with a first element of a wiper on the ram.
Figure 4B:
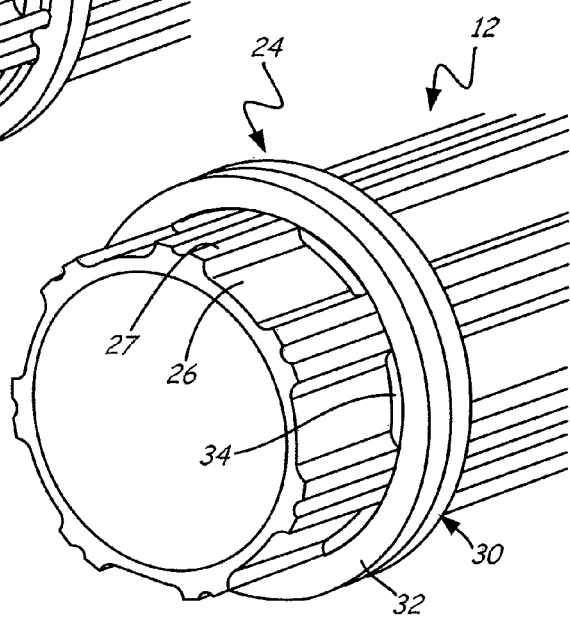
FIG. 4B is a perspective view of the translating ram of FIG. 4A with the first element and a wiper second element on the ram.
Figure 4C:
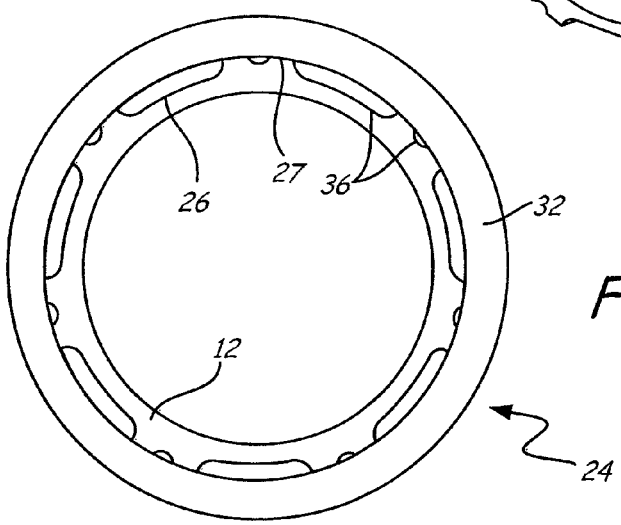
FIG. 4C is an end view of FIG. 4B.

FIG. 4A is a perspective view of a portion of translating ram 12 with first element 30 of wiper 24 on ram 12. FIG. 4B is a perspective view of translating ram 12 of FIG. 4A with the first element 30 and second element 32 on the ram 12. FIG. 4C is an end view of FIG. 4B. Translating ram 12 includes recessed portions 26 and external surfaces 27. Wiper 24 includes first element 30 (with extensions 34 and portions 36 conforming to recessed features of translating ram 12) and second element 32.

First element 30 of wiper 24 is placed on translating ram 12 so that portions 36 conforming to recessed features fit with recessed portions 26 of ram 12. Second element 32 is then placed axially adjacent to first element 30 to form wiper 24. Second element 32 fits over first element 30 and is supported by extensions 34 of first element 30. Wiper 24 forms a cross-sectional seal on translating ram 12, with portions 36 sealing recessed portions 26 of translating ram 12 and second element 32 fitting with first element 30 to seal over sharp edges of ram 12. Wiper 24 therefore works to prevent dirt or other debris from entering into actuator 10 as translating ram 12 is extended or retracted into housing 22.

By forming wiper 24 with a first element 30 conforming to the recessed features of the translating ram and a second element 32 conforming to the external surface of the translating ram, wiper 24 is able to form a seal over sharp edges and recessed portions 26 of translating ram 12. Wiper 24 allows the use and benefits of a translating ram with recessed portions while keeping dirt and debris out of the actuator 10 housing 22 and recirculating ballspline 20 (or other device which uses ram 12). The sealing against dirt and debris can prevent damage or a reduction in the life of the actuator.

While wiper 24 has been discussed in relation to use in an actuator with a recirculating ballspline, it can be used in with any device where a translating ram with recessed portions is used. Additionally, the configuration of recessed portions of translating ram and complimentary configurations of portions of wiper 24 to seal ram can be differed depending on needs of the system.

While a wiper with a first element 30 with extensions 34 to support second element 32 is shown, extensions 34 are not required, and first element and second element may just sit adjacent to each other and may be held in place by a housing. In an alternative embodiment, there may be some interlocking of first element and second element. Other embodiments could include a compression device, such as an o-ring, a spring, a clamp, etc. The compression device could fit around the outside diameter of wiper 24 and could provide a higher scraping force between wiper 24 and translating ram 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuator comprising:
   a housing;
   a translating ram with recessed features and an exterior surface to move in and out of the housing; and
   a wiper on the translating ram in the housing and adjacent to a recirculating ballspline, the wiper comprising a first element conforming to the recessed features of the translating ram and a second element conforming to an external surface of the translating ram, wherein the first element and second element conform to the cross-section of the translating ram, and wherein the first element further comprises a plurality of axial extensions over which the second element stretches and is supported thereby.

2. The actuator of claim 1, wherein the wiper seals the cross-section of the translating ram to prevent ingress of debris into the recirculating ballspline as the translating ram moves in and out of the housing.

3. The actuator of claim 1, wherein the first element is made of an elastic material.

4. The wiper of claim 1, wherein the second element is made of an elastic material.

5. The wiper of claim 1, wherein the wiper is held in place by the housing.

6. The wiper of claim 1, wherein the recirculating ballspline is in the housing adjacent to the wiper for the translating ram to move through.

7. The wiper of claim 1, wherein the extensions extend axially to connect to the second element when the second element is placed axially adjacent to the first element.

8. The wiper of claim 7, wherein the first element and the second element are held axially adjacent to each other by the extensions.

9. The wiper of claim 1, wherein the first element and second element together seal the cross-section of the translating ram to prevent ingress of debris as the translating ram moves through the wiper.

10. The wiper of claim 1, wherein the first element and the second element fit together to seal over a plurality of edges of the translating ram.

11. The wiper of claim 1, wherein the first element has a plurality of first surfaces that conform to the recessed features of the translating ram, and wherein the second element has a second surface that conforms to the exterior surface of the translating ram, and wherein angles between the first surfaces and second surface are about 90 degrees.

12. The actuator of claim 1, wherein the first element has a first outer diameter and the second element has a second outer diameter, and wherein the first outer diameter is approximately equal to the second diameter.

13. A method of manufacturing a wiper for a translating ram with recessed portions, the method comprising: forming a housing; forming a translating ram with recessed features and an exterior surface to move in and out of the housing; and forming a wiper on the translating ram in the housing and adjacent to a recirculating ballspline, the wiper comprising a first element conforming to the recessed features of the translating ram and a second element conforming to an external surface of the translating ram, wherein the first element and second element conform to the cross-section of the translating ram, wherein the first element further comprises a plurality of axial extensions over which the second element stretches and is supported thereby.

14. The method of claim 13, wherein the step of forming the first element further comprises forming extensions to support the second element.

15. The method of claim 13, wherein the first element and second element are formed of an elastic material.

\* \* \* \* \*